US010868969B1

(12) United States Patent
Haynold

(10) Patent No.: US 10,868,969 B1
(45) Date of Patent: Dec. 15, 2020

(54) METHOD AND APPARATUS FOR ACCELERATED TONEMAPPING AND DISPLAY

(71) Applicant: Oliver Markus Haynold, Evanston, IL (US)

(72) Inventor: Oliver Markus Haynold, Evanston, IL (US)

(73) Assignee: Promanthan Brains LLC, Series Gaze only, Evanston, IL (US)

( * ) Notice: Subject to any disclaimer, the term of this patent is extended or adjusted under 35 U.S.C. 154(b) by 0 days.

(21) Appl. No.: 16/199,218

(22) Filed: Nov. 25, 2018

Related U.S. Application Data

(62) Division of application No. 14/880,230, filed on Oct. 11, 2015, now Pat. No. 10,225,485.

(60) Provisional application No. 62/062,916, filed on Oct. 12, 2014.

(51) Int. Cl.
*G06T 5/50* (2006.01)
*H04N 5/235* (2006.01)
*G06T 5/00* (2006.01)

(52) U.S. Cl.
CPC .......... *H04N 5/2355* (2013.01); *G06T 5/007* (2013.01); *G06T 5/50* (2013.01); *G06T 2207/20208* (2013.01); *G06T 2207/20216* (2013.01)

(58) Field of Classification Search
None
See application file for complete search history.

(56) References Cited

U.S. PATENT DOCUMENTS 5,247,366 A 9/1993 Ginosar et al.
5,420,635 A 5/1995 Konishi et al.
5,517,242 A 5/1996 Yamada et al.
5,929,908 A 7/1999 Takahashi et al.
6,148,149 A 11/2000 Kagle
6,204,851 B1 3/2001 Netschke et al.
6,204,881 B1 3/2001 Ikeda et al.
6,418,245 B1 7/2002 Udagawa
(Continued)

FOREIGN PATENT DOCUMENTS

EP 0489552 A2 7/1992
EP 0572976 B1 4/1997
(Continued)

OTHER PUBLICATIONS

US 8,957,975 B2, 02/2015, Venkataraman et al. (withdrawn)
US 8,957,978 B2, 02/2015, Venkataraman et al. (withdrawn)

*Primary Examiner* — Robert J Craddock

(57) ABSTRACT

According to some embodiments, a camera captures video images at a high dynamic range. These images are then tonemapped into images of a lower dynamic range with enhanced contrast. The contrast enhancement for a given pixel depends on the image's local contrast at a variety of different scales. The tonemapped images are then shown on a display. Calculation of this contrast is accelerated by the camera creating a plurality of low-pass filtered versions of the original image at progressively stronger low-pass filtering; these images may be stored at increasingly lower resolutions in a mipmap. Calculations are enhanced by use of a massively parallel processor and a texture mapping unit for hardware-accelerated sampling of blended averages of several pixels. Other embodiments are shown and discussed.

20 Claims, 5 Drawing Sheets

(56) References Cited

U.S. PATENT DOCUMENTS

| | | | |
|---|---|---|---|
| 6,496,226 | B2 | 12/2002 | Takahashi et al. |
| 6,538,593 | B2 | 3/2003 | Yang et al. |
| 6,593,970 | B1 | 7/2003 | Serizawa et al. |
| 6,670,993 | B1 | 12/2003 | Yamamoto et al. |
| 6,677,992 | B1 | 1/2004 | Matsumoto et al. |
| 6,707,492 | B1 | 3/2004 | Itani |
| 6,720,993 | B1 | 4/2004 | Hwang et al. |
| 6,894,720 | B2 | 5/2005 | Zhang |
| 6,952,234 | B2 | 10/2005 | Hatano |
| 6,985,185 | B1 | 1/2006 | Crawford et al. |
| 7,061,524 | B2 | 6/2006 | Liu et al. |
| 7,106,913 | B2 | 9/2006 | Castorina et al. |
| 7,133,069 | B2 | 11/2006 | Wallach et al. |
| 7,193,652 | B2 | 3/2007 | Hori et al. |
| 7,239,757 | B2 | 7/2007 | Kang et al. |
| 7,433,514 | B2 | 10/2008 | Sloan |
| 7,454,136 | B2 | 11/2008 | Raskar et al. |
| 7,518,615 | B1 | 4/2009 | Airey et al. |
| 7,522,756 | B2 | 4/2009 | Bueno et al. |
| 7,983,496 | B2 | 7/2011 | Liu et al. |
| 8,014,445 | B2 | 9/2011 | Segall et al. |
| 8,068,140 | B2 | 11/2011 | Helbing |
| 8,072,507 | B2 | 12/2011 | Fuh et al. |
| 8,159,579 | B2 | 4/2012 | Jannard et al. |
| 8,237,730 | B1 | 8/2012 | Anderson et al. |
| 8,242,426 | B2 | 8/2012 | Ward et al. |
| 8,248,486 | B1 | 8/2012 | Ward et al. |
| 8,290,295 | B2 | 10/2012 | Criminisi et al. |
| 8,314,847 | B2 | 11/2012 | Brunner |
| 8,340,413 | B2 | 12/2012 | Cho et al. |
| 8,358,351 | B2 | 1/2013 | Brunner et al. |
| 8,363,131 | B2 | 1/2013 | Lin |
| 8,406,569 | B2 | 3/2013 | Segall et al. |
| 8,452,090 | B1 | 5/2013 | Brunner et al. |
| 8,456,547 | B2 | 6/2013 | Wloka |
| 8,456,548 | B2 | 6/2013 | Wloka |
| 8,456,549 | B2 | 6/2013 | Wloka |
| 8,503,539 | B2 | 8/2013 | Tran |
| 8,514,934 | B2 | 8/2013 | Ward et al. |
| 8,577,169 | B2 | 11/2013 | Andrus et al. |
| 8,634,476 | B2 | 1/2014 | Tran |
| 8,643,769 | B2 | 2/2014 | Frantz |
| 8,831,340 | B2 | 9/2014 | Paris et al. |
| 8,885,059 | B1 | 11/2014 | Venkataraman et al. |
| 8,896,719 | B1 | 11/2014 | Venkataraman et al. |
| 8,902,321 | B2 | 12/2014 | Venkataraman et al. |
| 8,989,484 | B2 | 3/2015 | Moon et al. |
| 9,041,823 | B2 | 5/2015 | Venkataraman et al. |
| 9,041,829 | B2 | 5/2015 | Venkataraman et al. |
| 9,049,367 | B2 | 6/2015 | Venkataraman et al. |
| 9,049,391 | B2 | 6/2015 | Venkataraman et al. |
| 9,060,121 | B2 | 6/2015 | Venkataraman et al. |
| 9,060,124 | B2 | 6/2015 | Venkataraman et al. |
| 9,060,142 | B2 | 6/2015 | Venkataraman et al. |
| 9,076,224 | B1 | 7/2015 | Shah et al. |
| 9,077,893 | B2 | 7/2015 | Venkataraman et al. |
| 2005/0168583 | A1 | 8/2005 | Thomason |
| 2009/0092203 | A1 | 4/2009 | Yu et al. |
| 2011/0109754 | A1 | 5/2011 | Matsunaga et al. |
| 2012/0147953 | A1 | 6/2012 | El-Mahdy et al. |
| 2012/0230597 | A1 | 9/2012 | Ward et al. |
| 2012/0237130 | A1 | 9/2012 | Wang et al. |
| 2012/0314100 | A1 | 12/2012 | Frank |
| 2013/0003086 | A1 | 1/2013 | Mebane et al. |
| 2013/0034307 | A1 | 2/2013 | Jerdev |
| 2013/0091430 | A1 | 4/2013 | Zhai et al. |
| 2013/0322753 | A1 | 12/2013 | Lim et al. |
| 2014/0078193 | A1 | 3/2014 | Barnhoefer et al. |
| 2014/0140615 | A1 | 5/2014 | Finlayson et al. |
| 2015/0054999 | A1 | 2/2015 | Bock |
| 2015/0055001 | A1 | 2/2015 | Bock |
| 2015/0178905 | A1 | 6/2015 | Fletcher et al. |
| 2015/0324662 | A1 | 11/2015 | Garg et al. |
| 2017/0134745 | A1 * | 5/2017 | Boitard .................. H04N 19/31 |

FOREIGN PATENT DOCUMENTS

| | | | |
|---|---|---|---|
| EP | 1302898 | A2 | 4/2003 |
| EP | 1500045 | A1 | 1/2005 |
| EP | 2144444 | A1 | 1/2010 |
| EP | 2411962 | A1 | 2/2012 |
| EP | 2533520 | A2 | 12/2012 |
| WO | 2011102887 | A1 | 8/2011 |
| WO | 2012164296 | A1 | 12/2012 |
| WO | 2014080068 | A1 | 5/2014 |

* cited by examiner

METHOD AND APPARATUS FOR ACCELERATED TONEMAPPING AND DISPLAY

RELATED APPLICATIONS

This application is a Divisional Application of my application Ser. No. 14/880,230, filed on 11 Oct. 2015, for a Method and Apparatus for Accelerated Tonemapping, which is hereby incorporated in full into this application. Application Ser. No. 14/880,230, in turn, claims priority from my Provisional Patent Application 62/062,916 for Method and Apparatus for Accelerated Tonemapping filed on 12 Oct. 2014, which is hereby incorporated in full into this application.

This application is related in subject matter to my patent application Ser. No. 14/280,605, filed on 17 May 2014, for an HDR Video Camera, which claims priority from my Provisional Patent Application 61/826,799, filed on 23 May 2013, and also for a HDR Video Camera; both applications are hereby incorporated in full into this application. It is also related in subject matter to my patent application Ser. No. 14/821,778 filed on 9 Aug. 2015, which claims priority from my Provisional Patent Application 62/040,373, filed on 21 Aug. 2014, for a Floating-Point Camera, both of which are also incorporated in full into this application.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of tonemapping images of high dynamic range, particularly in real-time applications such as cameras.

PRIOR ART

The following is a tabulation of some patent documents that appear relevant:

U.S. Patents

| Pat. No. | Kind Code | Issue Date | Patentee |
|---|---|---|---|
| 5,247,366 | B1 | 1993 Sep. 21 | Genossar et al. |
| 5,420,635 | B1 | 1995 May 30 | Inuiya et al. |
| 5,517,242 | B1 | 1996 May 14 | Nakano et al. |
| 5,929,908 | B1 | 1999 Jul. 27 | Ikeda et al. |
| 6,148,149 | B1 | 2000 Nov. 14 | Kagle |
| 6,204,851 | B1 | 2001 Mar. 20 | Netschke et al. |
| 6,204,881 | B1 | 2001 Mar. 20 | Ikeda et al. |
| 6,418,245 | B1 | 2002 Jul. 09 | Udagawa |
| 6,496,226 | B2 | 2002 Dec. 17 | Takahashi et al. |
| 6,538,593 | B2 | 2003 Mar. 25 | Yang et al. |
| 6,593,970 | B1 | 2003 Jul. 15 | Serizawa et al. |
| 6,670,993 | B1 | 2003 Dec. 30 | Yamamoto & Yoneyama |
| 6,677,992 | B1 | 2004 Jan. 13 | Matsumoto et al. |
| 6,707,492 | B1 | 2004 Mar. 16 | Itani |
| 6,720,993 | B1 | 2004 Apr. 13 | Hwang & Heo |
| 6,894,720 | B1 | 2005 May 17 | Zhang |
| 6,952,234 | B2 | 2005 Oct. 04 | Hatano |
| 6,985,185 | B1 | 2006 Jan. 10 | Crawford et al. |
| 7,061,524 | B2 | 2006 Jul. 13 | Gamal & Liu |
| 7,106,913 | B2 | 2006 Sep. 12 | Battiato et al. |

-continued

U.S. Patents

| Pat. No. | Kind Code | Issue Date | Patentee |
|---|---|---|---|
| 7,133,069 | B2 | 2006 Nov. 07 | Wallach & Koselka |
| 7,193,652 | B2 | 2007 Mar. 20 | Hori & Hui |
| 7,239,757 | B2 | 2007 Jul. 03 | Kang et al. |
| 7,433,514 | B2 | 2008 Oct. 07 | Sloan |
| 7,454,136 | B2 | 2008 Nov. 18 | Raskar et al. |
| 7,518,615 | B1 | 2009 Apr. 14 | Airey et al. |
| 7,522,756 | B2 | 2009 Apr. 21 | Bueno et al. |
| 7,983,496 | B2 | 2011 Jul. 19 | Liu et al. |
| 8,014,445 | B2 | 2011 Sep. 06 | Kerofsky & Segall |
| 8,068,140 | B2 | 2011 Nov. 29 | Helbing |
| 8,072,507 | B2 | 2011 Dec. 06 | Chen et al. |
| 8,159,579 | B2 | 2012 Apr. 17 | DaSilva et al. |
| 8,237,730 | B1 | 2012 Aug. 07 | Anderson & Cook |
| 8,242,426 | B2 | 2012 Aug. 14 | Heidrich et al. |
| 8,248,486 | B1 | 2012 Aug. 21 | Ward et al. |
| 8,290,295 | B2 | 2012 Oct. 16 | Criminisi et al. |
| 8,314,847 | B2 | 2012 Nov. 20 | Brunner |
| 8,340,413 | B2 | 2012 Dec. 25 | Cho et al. |
| 8,358,351 | B2 | 2013 Jan. 22 | Brunner et al. |
| 8,363,131 | B2 | 2013 Jan. 29 | Lin |
| 8,406,569 | B2 | 2013 Mar. 26 | Segall et al. |
| 8,452,090 | B1 | 2013 May 28 | Brunner et al. |
| 8,456,547 | B2 | 2013 Jun. 04 | Wloka |
| 8,456,548 | B2 | 2013 Jun. 04 | Wloka |
| 8,456,549 | B2 | 2013 Jun. 04 | Wloka |
| 8,503,539 | B2 | 2013 Aug. 06 | Tran |
| 8,514,934 | B2 | 2013 Aug. 20 | Ward et al. |
| 8,634,476 | B2 | 2014 Jan. 21 | Tran |
| 8,643,769 | B2 | 2014 Feb. 14 | Frantz |
| 8,831,340 | B2 | 2014 Sep. 09 | Paris et al. |
| 8,885,059 | B1 | 2014 Nov. 11 | Venkataraman et al. |
| 8,896,719 | B1 | 2014 Nov. 25 | Venkataraman et al. |
| 8,902,321 | B2 | 2014 Dec. 02 | Venkataraman et al. |
| 8,957,975 | B2 | 2015 Feb. 17 | Venkataraman et al. |
| 8,957,978 | B2 | 2015 Feb. 17 | Venkataraman et al. |
| 8,989,484 | B2 | 2015 Mar. 24 | Moon et al. |
| 9,041,823 | B2 | 2015 May 26 | Venkataraman et al. |
| 9,041,829 | B2 | 2015 May 26 | Venkataraman et al. |
| 9,049,367 | B2 | 2015 Jun. 02 | Venkataraman et al. |
| 9,049,391 | B2 | 2015 Jun. 02 | Venkataraman et al. |
| 9,060,121 | B2 | 2015 Jun. 16 | Venkataraman et al. |
| 9,060,124 | B2 | 2015 Jun. 16 | Venkataraman et al. |
| 9,060,142 | B2 | 2015 Jun. 16 | Venkataraman et al. |
| 9,076,224 | B1 | 2015 Jul. 07 | Shah et al. |
| 9,077,893 | B2 | 2015 Jul. 07 | Venkataraman et al. |

U.S. patent Application Publications

| Publication Number | Kind Code | Publication Date | Applicant |
|---|---|---|---|
| 2005,0168,583 | A1 | 2005 Aug. 4 | Thomason |
| 2011,0109,754 | A1 | 2011 May 12 | Matsunaga et al. |
| 2012,0147,953 | A1 | 2012 Jun. 14 | El-Mahdy et al. |
| 2012,0230,597 | A1 | 2012 Sep.13 | Simmons et al. |
| 2012,0237,130 | A1 | 2012 Sep. 20 | Wang et al. |
| 2012,0314,100 | A1 | 2012 Dec. 13 | Frank |
| 2013,0003,086 | A1 | 2013 Jan. 03 | Mebane et al. |
| 2013,0034,307 | A1 | 2013 Feb. 07 | Jerdev |
| 2013,0091,430 | A1 | 2013 Apr. 11 | Zhai |
| 2013,0322,753 | A1 | 2013 Dec. 05 | Lim et al. |
| 2014,0078,193 | A1 | 2014 Mar. 20 | Barnhoefer & Jeter |
| 2014,0140,615 | A1 | 2014 May 22 | Finlayson & Singnoo |
| 2015,005,4999 | A1 | 2015 Feb. 26 | Bock |
| 2015,005,5001 | A1 | 2015 Feb. 26 | Bock |

Foreign Patents

| Pat. No. | Kind Code | Issue Date | Patentee |
|---|---|---|---|
| EP 0,572,976 | B1 | 1997 Apr. 09 | Canon Kabushiki Kaisha |
| EP 1,302,898 | B1 | 2006 Oct. 04 | Zhang et al. |
| EP 1,500,045 | B1 | 2006 Oct. 11 | Philips Electronics N.V. |
| EP 2,144,444 | B1 | 2012 Jul. 27 | Banterle et al. |

Foreign Application Publications

| Publication Number | Kind Code | Publication Date | Applicant |
|---|---|---|---|
| EP 0,489,552 | A2 | 1992 Jun. 10 | Tindall |
| EP 2,411,962 | A1 | 2012 Feb. 01 | Hewlett-Packard Development Co. |
| EP 2,533,520 | A2 | 2012 Dec. 12 | Frank |
| WO 2,011,102,887 | A1 | 2011 Aug. 25 | Zhai et al. |
| WO 2,012,164,296 | A1 | 2012 Dec. 06 | Smith |
| WO 2014,080,068 | A1 | 2014 May 30 | Aarnio |

BACKGROUND

My patent application Ser. No. 14/280,605 and my patent application Ser. No. 14/821,778 teach a number of aspects of capturing and processing tonemapped HDR images, particularly for real-time video capture. Given that all known methods of tonemapping that produce high-quality tonemapped HDR images are rather computationally expensive, there is an unmet need for improving the performance of this tonemapping so as to enable processing of higher resolutions and higher frame rates, in particular on affordable and compact mobile devices such as smartphones and hand-held cameras.

SUMMARY

According to some embodiments, a camera captures video images at a high dynamic range. These images are then tonemapped into images of a lower dynamic range with enhanced contrast. The contrast enhancement for a given pixel depends on the image's local contrast at a variety of different scales. The tonemapped images are then shown on a display. Calculation of this contrast is accelerated by the camera creating a plurality of low-pass filtered versions of the original image at progressively stronger low-pass filtering; these images may be stored at increasingly lower resolutions in a mipmap. Calculations are enhanced by use of a massively parallel processor and a texture mapping unit for hardware-accelerated sampling of blended averages of several pixels. Other embodiments are shown and discussed.

ADVANTAGES

Some advantages of some embodiments include:

a) Use of a mipmap representation of the image to be tonemapped saves memory and memory bandwidth, thus allowing operation on devices constrained by available memory and memory bandwidth. Even where absolute memory available is not a problem, reducing memory use allows more efficient use of a CPU's memory cache.
b) Hardware-accelerated interpolation between pixels of mipmap levels greatly improves read performance.
c) Irregularly spaced sample points interpolated between pixels reduce artifacts in the tonemapped images.
d) Gaussian blurring at increasingly wide radii, respective to the image's dimensions, provides for very smooth output images and is accelerated by applying Gaussian blurring at relatively low radii, respective to the number of samples needed, at progressively reduced image resolutions.
e) Accordingly, some embodiments allow either the use of cheaper hardware to obtain the same image quality, resolution, and frame rate, or to improve image quality, resolution, and frame rate on the same hardware.
f) Tonemapping images as they are captured reduced storage needed for the captured image file, a particular advantage for video and on mobile devices
g) Efficient use of computational resources saves battery power, again a particular advantage on mobile devices
h) The operator may change tonemapping parameters for a video stream and see the results in real time

DRAWINGS—REFERENCE NUMERALS

Figure 1:
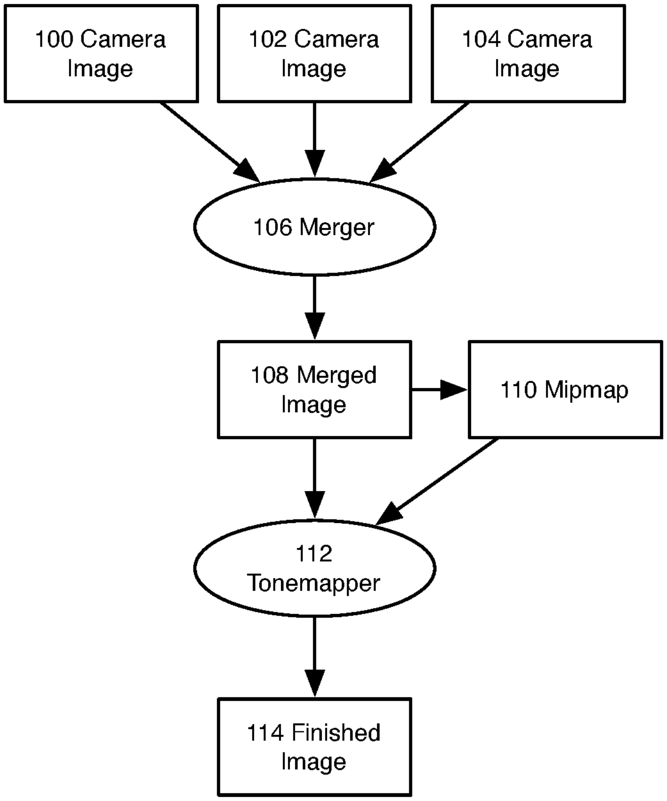
FIG. 1 shows the data flow of the first embodiment.

100 Camera image
102 Camera image
104 Camera image
106 Merging shader
108 Merged image
110 Mipmap of merged image
112 Tonemapper shader
114 Finished image
200 Pixel locations in current mipmap level
202 Pixel of interest
204 Sample point
300 Smartphone
302 Tonemapped video image
304 Tonemapping settings
400-422 labelled on drawing
500 HDR camera image
502 Preprocessor filter
504 Preprocessed image
506 Horizontal blur filter
508 Vertical blur filter
510 Blurred luminance mipmap
512 Blurred luminance mipmap level 1
514 Blurred luminance mipmap level 2
516 Blurred luminance mipmap level 3
518 Blurred luminance mipmap level 4
520 Blurred luminance mipmap level n
522 Tonemapper filter
524 Finished image

DETAILED DESCRIPTION

First Embodiment—FIGS. 1-4

The first embodiment is a video camera capable of capturing images in high dynamic range and converting them in real time into a tonemapped video stream of lower dynamic range suitable for storage in a standardized video file format. The data flow of the first embodiment is shown in FIG. 1. This embodiment may be implemented as an 'app' on a smartphone. The smartphone may be the iPhone™ 6 made by Apple of Cupertino, Calif., which is capable of executing shaders written in the Metal™ language on its GPU. Alternatively, a GPU or digital signal processor on a different hardware platform may use, for example, the OpenGL® ES 3.0 Shading Language to implement the operations described. This first embodiment is a high-dynamic-range camera, which creates still images and movies of a much higher dynamic range than is natively possible with the phone's built-in sensor.

Figure 4:
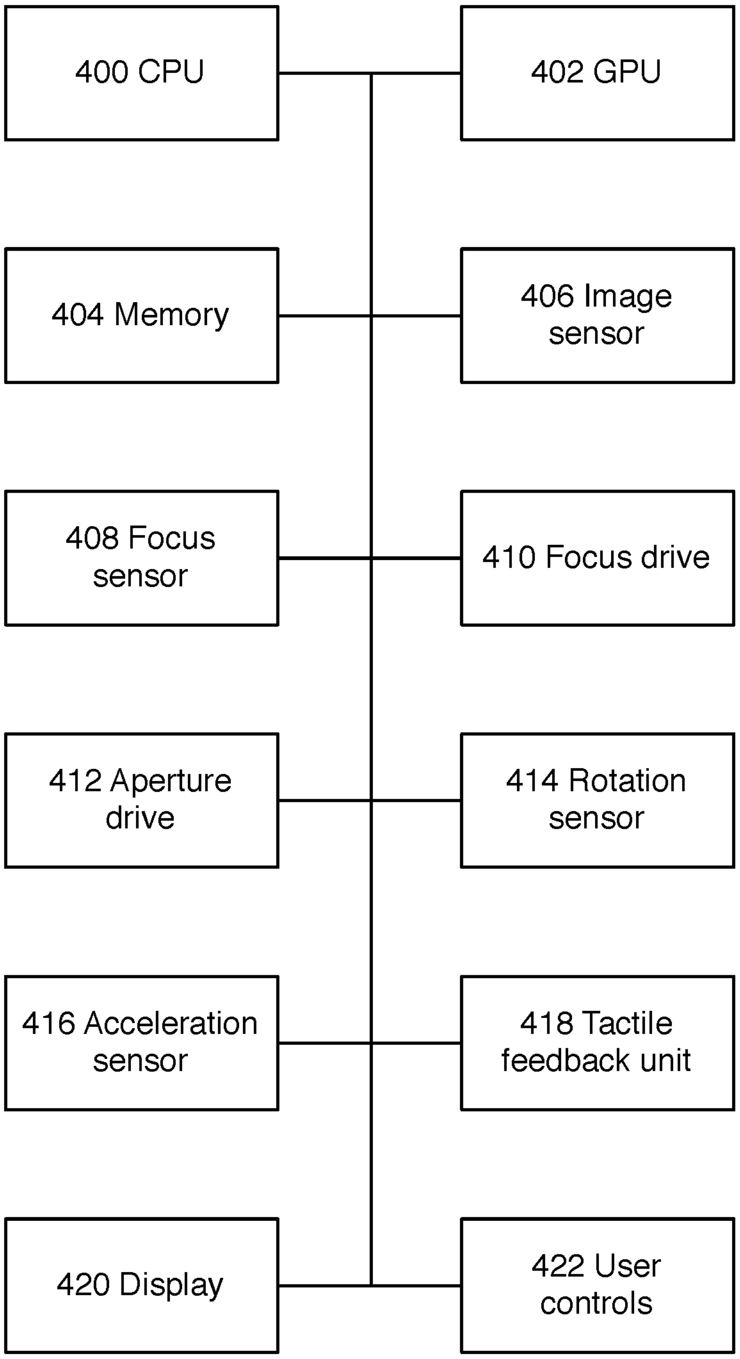
FIG. 4 shows the electronic components of the first embodiment.

FIG. 4 shows a schematic of various components that may be present in the first embodiment. There may be a central processing unit 400 and a graphics processing unit 402, which may be equipped with a texture mapping unit and an internal cache. There may be memory 404, which may be divided into volatile random-access memory (RAM) and non-volatile flash memory. RAM may be shared between the CPU 400 and the GPU 402, or the processors may use separate RAM. There may be an image sensor 406, a focus sensor 408, a focus drive 410, and an aperture drive 412. There may also be a rotation sensor 414 and an acceleration sensor 416 as well as a tactile feedback unit 418, a display 420 which may be a touchscreen, and a set of other user controls 422. Not all of these components need be present and some components may be present several times. Although in FIG. 4 all components are symbolically illustrated as being connected by a single bus system, they may be connected through several bus or other signal systems of different speeds and electrical properties.

For each video frame, for example 30 times per second, the control software of the app instructs the camera to take three exposures at different exposure biases 100, 102, and 104, for example one image with an exposure bias of 0, one with a bias of −2 EV units, and one with a bias of +2 EV units. These images are created by the built-in camera as 8-bit integer representations with three color channels, corresponding to Red, Green, and Blue. An integer value of 0 stands for no appreciable light at the pixel for that color channel, and an integer value of 255 represents sensor saturation for that pixel and channel. Alternatively, if the camera itself is capable of delivering images in high dynamic range, the control software may instruct the camera to take only one HDR exposure for each video frame.

The merger 106 may be implemented as a Metal compute shader in the Metal Shading Language. The three images 100, 102, and 104 from the camera get converted into Metal textures. The merger shader 106 then merges these 8-bit images into a merged image 108. The operation of this merging shader may be implemented as taught in my patent application Ser. No. 14/280,605 and my patent application Ser. No. 14/821,778. The output of this merging shader is an image in floating-point space and in the YUV color space with four color channels. The first channel encodes the logarithm, for example base 2, of the luminance in the merged image. So if the luminance of a pixel is fully saturated in the darkest of the three original exposures, the value of the logarithmic luminance channel in the merger's output texture would be 0. If the pixel has a luminance of one half the luminance that would correspond to full saturation, its value will be encoded as −1.

A special rule is needed where even the brightest of the original exposures records a value of zero on all color channels, and thus the measured luminance would be zero, corresponding to negative infinity in log space. To deal with this situation, we take any value of zero in a color channel of the brightest of the original three images (where the values may range from zero to 255) to mean a value of 0.5—the camera is not telling us about the complete absence of light, but merely that there is not enough light to trigger a sensor response.

The second and third color channels of the merged image output by the merging shader encode the chrominance values U and V of the merged pixel, also in floating-point representation. The width of the floating point numbers in the merged image may be any floating-point precision supported by the hardware, with 16 bit or 32 bit being common choices, depending on the hardware available and the quality of the images delivered by the camera. As of this writing, 16 bit tends to be sufficient for common smartphone cameras while 32 bit is advantageous for dedicated cameras that deliver higher image quality. On some hardware it is also advantageous to include a fourth color channel in the output image that may be set to zero so as to accommodate the hardware's or the driver's preference for four rather than three color channels.

Alternatively, if the camera itself delivers images in high dynamic range, such as 16-bit integers for each pixel and color channel, the merger may simply take one input image 100 and transform it into a representation where each pixel and color channel is represented by a 32-bit floating-point number. In this case, the term 'merger' is a bit of a misnomer since no images need to be merged.

We now have an image, stored as a Metal texture 108, that holds for each pixel the logarithm of the luminance in the first color channel and the chrominance in two additional color channels.

Alternatively, this image in texture 108 may be obtained directly from a sensor capable of providing images of high dynamic range from one exposure. For example, the Exmor RS™ image sensors made by Sony Corporation of Tokyo, Japan can generate images of substantial dynamic range and are being used in a number of smartphone cameras. For example, on the iPhone™ 6 made by Apple, HDR video directly from the sensor may be obtained by selecting an AVCaptureDeviceFormat where the property videoHDR-Supported is set to YES. The tradeoff here is that using one exposure in HDR directly from the sensor reduces issues of ghosting and is faster than taking several exposures, but the dynamic range expansion achievable this way is lower than what could be obtained from combining several distinct exposures. The camera application may also allow the user the choice between two modes, one of which uses a single HDR exposure and one of which combines several exposures for each video frame.

The tonemapping shader 112 will need a mipmap representation of the texture 108. In Metal, this can be calculated by the method generateMipmapsForTexture: of MTLBlitCommandEncoder. In Open GL ES, the corresponding call would be to the glGenerateMipmap( ) function. Either way, we obtain a mipmap 110 attached to the texture 108. The mipmap calculation routine is highly optimized and very performant and makes use of the CPU's texture mapping unit for very fast access to input data.

Now the tonemapping shader 112 can calculate a tonemapped color value for each pixel. This tonemapping shader may be implemented as shown in the attached computer program listing Tonemapper1.metal. We will now discuss the kernel function tonemapper( ) in this listing in some level of detail.

At first, tonemapper( ) converts the position in the computation grid, which is expressed as integer values of pixel positions, into the coordinate system of the sampler, which is expressed in floating-point numbers between 0 and 1. The function reads out the value of the pixel at the present location into the variable yuv. Then the function calculates an adaptive luminance value yRef, which we will shortly discuss in more detail. Once that value is calculated, the function adapts the luminance of the present pixel, stored in log-space in the first component of yuv. It decreases global contrast by adding the term options.globalContrast*(yRef+1) to the luminance; remember that luminance is stored in log space base 2, so this term brings the value of the luminance closer to −1, corresponding to a luminance value of 0.5 in linear space; options.globalContrast should be a negative number. The function also increases local contrast by enhancing the difference between the pixel's original luminance and the yRef adaptive luminance, with a cutoff so that small contrasts that are likely noise are not enhanced. Finally, the function converts the pixel value into sRGB color space and writes it to the output texture. So far, this has been reasonably straightforward. The difficult part is the calculation of a proper value for yRef.

Ideally, the method we would like to use would work like this: We calculate a series of images, for example seven images, that are increasingly strong Gaussian blurs of the original luminance values, all in the same resolution as the original image. The width of the Gaussian blur in each of these images may increase in powers of two. Then in order to calculate yRef we look successively at each of these images. If the luminance value of the image at a given blur level is sufficiently close to the luminance value of the original pixel and/or the previous blur level, we say that the eye would recognize this luminance value to be in the neighborhood of the pixel's original luminance value and use it for our calculation of adaptive brightness. We then use the next, more strongly blurred, image in the series to repeat this calculation. If the luminance value of the blur level is too different from the previous blur level's or the original pixel's luminance value, we break off the calculation. We may then use either the luminance value we encountered in the last blur level that was within the threshold or some weighted average of the luminance values of all the blur levels encountered until then as the adaptive luminance value. This method gives a reasonably good approximation to how the human eye evaluates the luminance of an image detail versus the detail's visual neighborhood. One may also want to use a kernel with a slightly different shape than Gaussian to compute the blurs, but either way one has to calculate the successive levels of blurred images.

The difficulty in this approach is that a Gaussian blur is expensive to compute. Theoretically, each pixel in an original image influences the value of each pixel in the Gaussian blur, so computational effort would increase enormously with the number of pixels. For practical image sizes that give attractive pictures, this is clearly not very useful. In practice, one can speed up the computation substantially by using a kernel that looks only at a smaller number of pixels, ignoring the pixels that have very little weight in the calculation, and by decomposing the blur into a horizontal and a vertical component, techniques well-known in the art. But still, computing nine levels of Gaussian blur with inspection of 9 pixels each in the horizontal and the vertical direction for an image of just one megapixel would take $9\times(2\times9)\times1{,}000{,}000=162{,}000{,}000$ texture reads. This is acceptable where computational power is plentiful, such as for processing a single image in high quality or on specialized camera hardware with powerful processors, but it is too slow for real-time video on affordable platforms like smartphones. We need a better solution; in some embodiments of the invention, this better solution works as shown for the calculation of yRef in the tonemapper( ) function, which we will discuss now.

As already described above, we are using a mipmap of the input image, a technique well-known in the art and made fast by aggressive hardware and driver optimization on virtually all modern GPUs and similar massively parallel processors. The mipmap takes up only one third of the storage space of the original image due to is use of successively smaller image sizes for higher mipmap levels.

The simplest possible way to calculate yRef now would be to read out the value for each mipmap level for the position of the pixel in question, i.e. to use nearest-neighbor interpolation, and to use each mipmap level in this way instead of the various levels of Gaussian blur we would really like to have if they were not so expensive to calculate. This approach would be blazing fast, but it would lead to ugly artifacts on the resulting pictures similar in appearance to very aggressive lossy image compression.

One simple way to improve this problem would be to use bilinear interpolation instead of nearest neighbor-interpolation to obtain the values of each mipmap level. In Apple's Metal framework this can be achieved by setting the minFilter and magFilter of the sampler used to obtain the pixel values to MTLSamplerMinMagFilterLinear, and in OpenGL ES it can be achieved by calling glTexParameteriv( ) to set GL_TEXTURE_MIN_FILTER and GL_TEXTURE_MAG_FILTER to GL_LINEAR. (In the particular application we are discussing, only the min filters matter.) This will replace squares with constant values corresponding to an entire region of the image represented by one pixel in the mipmap by a linear interpolation for each pixel's position, and will give much better results. It is also very fast. Even though calculating this linear interpolation accesses the values of four pixels instead of one from the corresponding mipmap level, this access is accelerated by the CPU's texture mapping unit and on many modern CPU's is hardly more expensive than reading just one pixel. There is also a good chance that the right pixel values will still be in cache for processing adjacent pixels which greatly reduces the memory bandwidth required. Bilinear interpolation for accessing the mipmap levels will give much better results than nearest-neighbor interpolation, but since bilinear interpolation gives notoriously discontinuous gradients at pixel edges, it will still create more artifacts than we are willing to tolerate for a high-quality output image.

The next improvement we introduce is to sample several locations adjacent to the location of the pixel we are interested in. For example, we could sample the value of each mipmap one pixel to the top, left, right, and bottom of the location we are interested in. Since each mipmap level has half the resolution of the previous level, the sampling distance expressed in floating-point coordinates increases by a factor of two for each mipmap level, as is expressed by sampleOffset being multiplied by 2 in each round of the calculation of yRef in the program listing. Thus, we are averaging the values of several samples, four in our case, to obtain a smoothed value yNew for our calculation of yRef. The computational cost of this is relatively low since each access gets accelerated by the texture mapping unit and the relevant pixels will often be in cache. Since this obtaining several samples and averaging them is in itself a blur operation, the first round of the calculation takes its samples not from the first reduced-size mipmap level, but from the full-size picture itself. So in effect, we're taking the information for our first blur level from the picture itself, the information for the second blur level from the first mipmap level, and so on.

Figure 2:
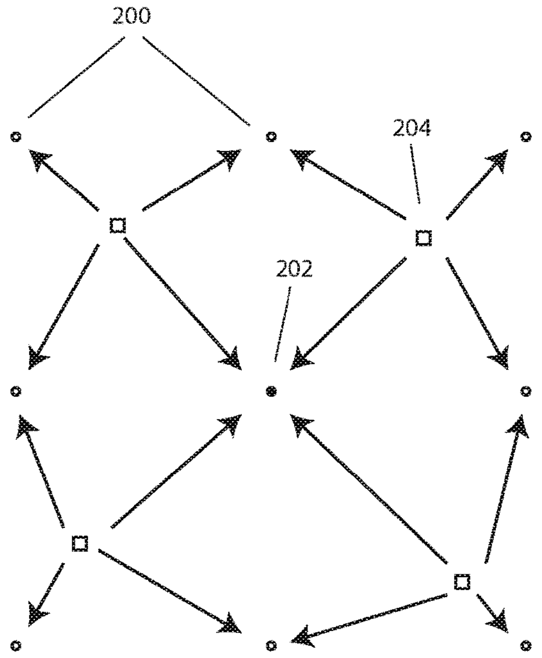
FIG. 2 shows the pixel access pattern of the tonemapper of the first embodiment.

This approach can be refined even more by varying the sampling locations slightly. In the program listing we can see that the sampler sometimes uses 0.6 and sometimes uses 0.75 time sampleOffset as the distance at which to take the sample. This irregularity further helps to reduce artifacts from gradient discontinuities at pixel boundaries. This access pattern is shown in FIG. 2, where the circles 200 show the pixel locations for the current mipmap level, 202 shows the pixel for which we wish to obtain a value, and the squares 204 show the sampling locations offset as given in tonemapper( ). The reader can see that with our four calls we are obtaining luminance information from nine pixels of the currently selected mipmap level.

So in summary our calculation of yNew in the program listing makes use of several techniques to obtain a good approximation of a Gaussian blur to be used for calculation of the adaptive brightness yRef at drastically reduced computational cost. First, we are using a mipmap instead of actually running a full Gaussian convolution. Second, we are using the interpolation provided by the CPU's texture mapping unit for extremely fast linear interpolations between adjacent pixels. Third, we are combining a small number, four in our case, although this may be varied as computational performance allows, of samples from each mipmap level into a smoothed value corresponding to that level. And fourth, we are taking these samples at somewhat irregular locations from the center of the pixel. Together, this gives us a good value for yRef that leads to nice tonemapping results even for difficult scenes or extreme values of local contrast improvement.

By repeating this process over and over for new exposures, for example 30 times per second, this processing logic can not only generate tonemapped still images but tonemapped movies rendered in real time as well. In 2014, the program listing shown was able to tonemap 720p video at 30 frames per second on Apple's iPhone™ 6 and still leave enough unused processor and GPU capacity for compressing and recording that video stream in addition to displaying it on screen.

In terms of performance improvement, we are making 7×4=24 sampling calls per pixel to calculate yRef whereas a Gaussian blur for seven levels would take at least ten times as many if it is to be in acceptable quality. Although we are only making 4 calls for each mipmap level, we are really looking at a neighborhood of 9 pixels, but we are letting the CPU's texture mapping unit average these into four values for us using hardware-accelerated linear interpolation. What is even more important than the reduced number of calls is the more compact memory representation from using the mipmap, which means that many more pixel values will be found in cache, leading to a drastic improvement in speed and reduced memory bandwidth required.

Figure 3:
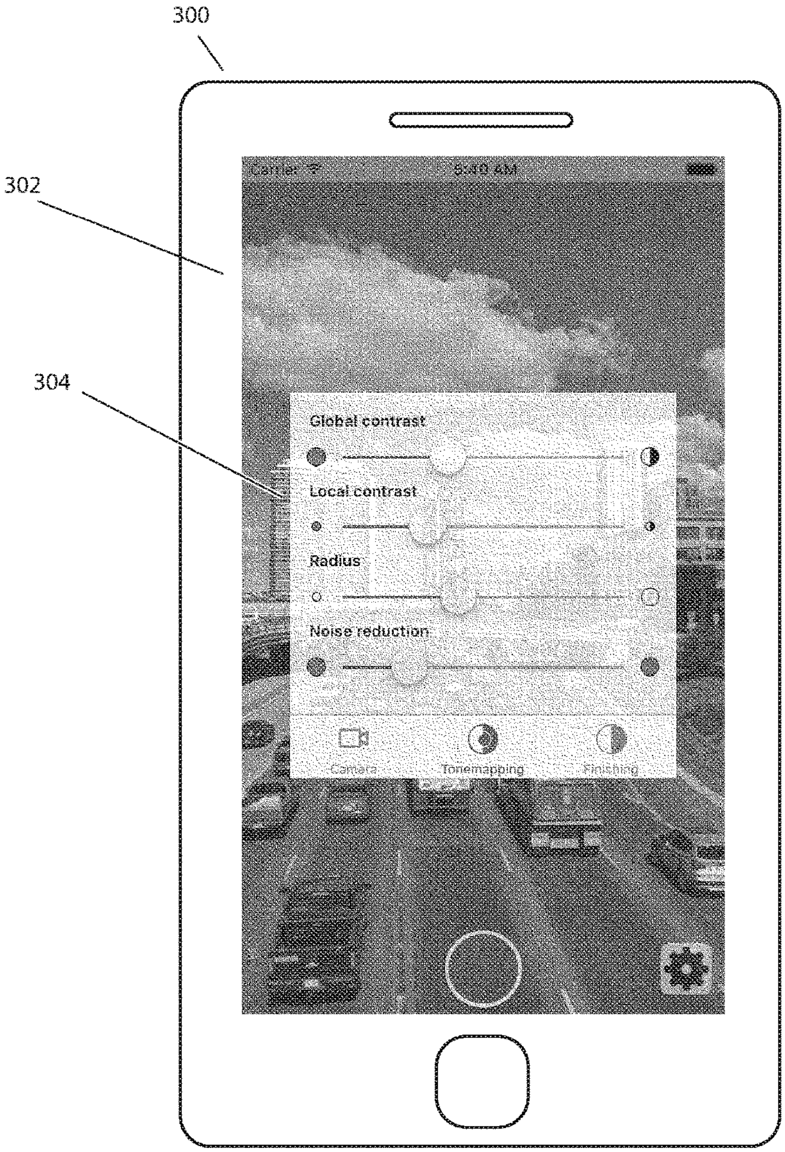
FIG. 3 shows the graphical user interface of the first embodiment.

FIG. 3 shows the graphical user interface of the first embodiment. The user can set the parameters going into tonemapperOptions in the program listing using sliders on the screen. Video processing is in real time at 30 frames per second, and thus the visual effect of changes in the settings becomes apparent immediately, allowing the user to fine-tune the desired effect.

Figure 5:
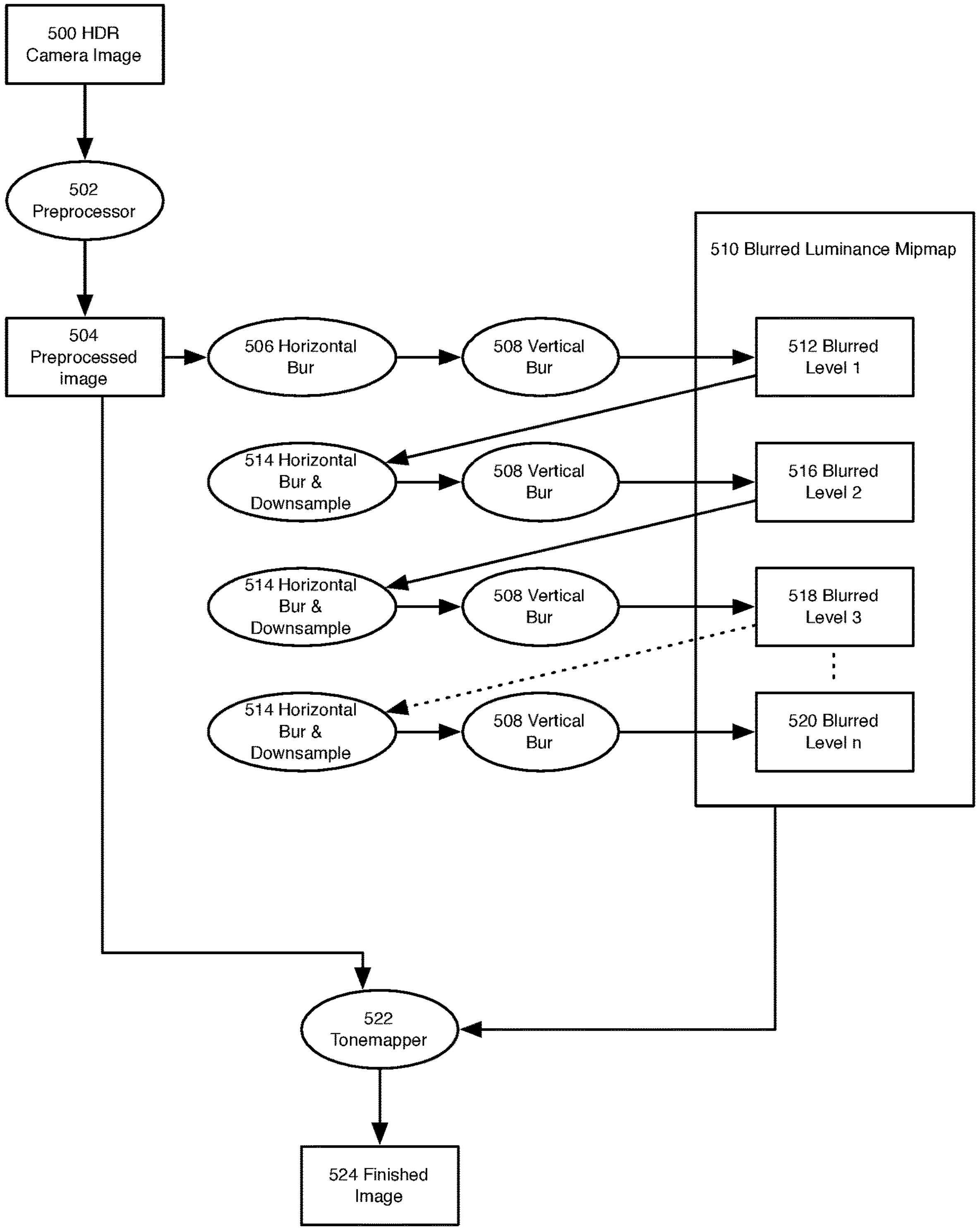
FIG. 5 shows the data flow of the second embodiment.

Second Embodiment—FIG. 5

The second embodiment is also a HDR video camera that may be serving a function similar to a the first embodiment, but with a different tradeoff between speed and image quality. The second embodiment will on many platforms be substantially more computationally intensive than the first embodiment, but in return it creates fewer artifacts visible even under extreme lighting conditions and may thus be used for more extreme tonemapping settings to capture scenes with even higher dynamic range or for artistic effect. Applicant's experiments have shown the second embodiment to be capable of recording tonemapped video with 30 frames per second in 1080p resolution on an iPhone™ 6S made my Apple of Cupertino, Calif. The general electrical architecture of the second embodiment may be as shown for the first embodiment in FIG. 4 and the user interface may look as shown for the first embodiment in FIG. 3.

FIG. 5 shows the data flow of the second embodiment and Program Listing Tonemapper2.metal gives source code in the Metal™ Shading Language available on the iPhone™ 6S for the second embodiment.

The second embodiment starts with a raw RGB HDR image 500. This image may be either delivered directly from an image sensor capable of taking HDR exposures or it may be composed by a fusion of several image frames taken at different exposure parameters in a lower dynamic range.

Preprocessor 502 prepares the raw image for processing, and source code for it is given in the kernel sRGBA2YUVA in the program listing. For each pixel, the preprocessor reads in the color value and converts it into YUV color space. To avoid log values of negative infinity for a sensor reading of zero, the luminance value before the log is taken is clamped to a non-zero value of one bit more resolution than the resolution of the camera input. In the listing we assume that the incoming video frames are in high dynamic range, but still only with a depth of 8 bit per channel. Thus, we clamp the luminance value to values between $1/512$ and 1. Similarly, for a camera delivering 10 useful bits of luminance values, one would limit the luminance value to a minimum of $1/2048$, and so on. The preprocessor also compensates for the camera's reduced saturation at lower luminance values by calculating a saturation boost factor satBoost as $(1-Y)^2$ where Y is the luminance between 0 and 1. Finally, the preprocessor takes the binary logarithm of the luminance value for speed and convenience further down the data pipeline, multiplies the saturation values with satBoost, and stores the YUV values into the preprocessed image 504, which should be the same size in terms of height and width as the original image 504 and should be stored in a floating-point number format, such as IEEE 745 numbers in 16 or 32 bit for each pixel and color channel.

Next, a series of processing steps create the blurred luminance map 510 out of the preprocessed image 504. The blurred luminance map should be a GPU texture of the same height and width as the original image 500, preferably use the same floating-point representation as the preprocessed image 504, and should allocate memory for a mipmap representation; however, it only needs a single color channel for luminance.

Filters 506 and 508 in conjunction efficiently generate a Gaussian blur of the luminance channel of preprocessed image 504 in the highest-resolution mipmap level of image 510. Two-dimensional Gaussian blur is an operation that can be decomposed into two one-dimensional Gaussian blurs with great savings in computational effort. Thus filter 506, which is given in the listing as kernel horizGaussianBlur, performs a horizontal Gaussian blur, and filter 508, which is given in the listing as vertGaussianBlur performs a vertical Gaussian blur. The horizontal and vertical filters are identical except for their direction of operation. They both use the same method that was already used in the first embodiment to use the CPU's texture mapping unit to obtain weighted averages of several pixels with a single sampler call, except in the case of these two filters each sampler call can only average two pixels since no mixing of rows is needed when processing columns and the other way around. Thus the input parameter inSampler should be configured for at least bilinear interpolation between pixel coordinates. The Gaussian blur filters then use the fractional offsets stored in constant gaussianBlurOffsets to read a weighted average of two neighboring pixels at the appropriate offset from the pixel currently under consideration. Three offsets applies in both directions correspond to reads from five pixels (not six, since the central pixel is read twice), and the values thus red are blended into a weighted average using the weights gaussianBlurWeights. The offsets and weights given are chosen to give a good approximation to a Gaussian blur with $\sigma=2.5$ using five pixels, but those skilled in the art will be able to calculate appropriate constants for a different number of pixels (for example, with increasing availability of computational power, one may use seven or nine pixels instead of five) or a different a. Application of horizontal blur filter 506 followed by vertical blur filter 508 turns the luminance channel of preprocessed image 504 into a blurred, and thus low-pass filtered, version of the luminance channel of the same image at the same resolution.

In the next step, the camera fills out the higher mipmap levels of blurred luminance map 510 with increasingly more blurred versions of the first blurred luminance map 512 we just generated. Each mipmap level is generated by downsampling and applying further Gaussian blur to the previous mipmap level. Thus, to generate the second mipmap level 516, we first apply filter 514 for a Gaussian blur and downsample. Filter 514 may use the source code of kernel horizGaussianDownsampler in the program listing. The array horizGaussianDownsamplerOffsets provides non-integer horizontal offsets, and the kernel samples its input texture at these horizontal offsets. In the vertical, the sampling points will fall right into the center between two image rows (exactly so if the image's dimensions are powers of two, otherwise approximately so). Thus, each sampler call will use the CPU's texture mapping unit to obtain a weighted average of four pixels at once with computational cost that is not significantly higher than for obtaining only one pixel at once, providing for a speedy calculation of the blur. The offsets and the corresponding weights in horizGaussianDownsamplerWeight and horizGaussianDownsamplerZeroWeight are chosen so as to give a blur corresponding to $\sigma=2.5$. The output of the horizontal blur and downsample operation is then vertically blurred by the vertical blur filter 508, which is the same filter that was used for blurring the first mipmap level since downsampling is already done and thus the filter should generate and output image the size of its input image. This leads to the blurred luminance map for the second mipmap level 516. The process is then continued for increasingly smaller and more blurred representations of the image's luminance map into the third mipmap level 518, and so on for all mipmap levels up to the highest mipmap level 520, which is just one pixel by one pixel small.

This method for calculating a sequence of increasingly blurred, and thus low-frequency filtered, representation of the input image's luminance is advantageous over the first embodiment, provided that enough computational power is available, in that a Gaussian blur generates much smoother blurs than the 2×2 box blur typically used by the system-provided mipmap generation routines. Thus, with the parameters chosen for the blur radii, one can upsample the mipmap levels again to the source image's full resolution using linear interpolation and will hardly see any artifacts from that linear interpolation, which is not necessarily true in the first embodiment. The price to pay on many platforms is an increase in computational requirements compared to the first embodiment. Nonetheless, this method is fast enough to process 1080p video with 30 frames per second on the most modern consumer-oriented smartphones as of the time of this writing. Compared to the other possibility of generating Gaussian blurs of increasing blur radii, the method shown is vastly more computationally efficient, not only in memory but especially in computing operations and memory reads needed. To compute a Gaussian blur with an increased radius, the values of many more pixels become relevant, and thus one cannot get away, without introducing artifacts, with merely five or seven reads per column or row of the image. The second embodiment chooses a compromise between highest quality, and thus artifact avoidance, and computational efficiency by calculating the first blur in the full image resolution and then calculating all additional blurs with reduced image resolution and the same Gaussian blur radius in pixels as the first blur, which due to the increasingly lower image resolutions translates into increasingly high blur radii in terms of image dimensions. Thus, the blurred luminance map 510 gets generated as a Gaussian pyramid of the luminance channel of the preprocessed image 504 with increasingly lower image resolution and increasingly more Gaussian blur radius applied. Some embodiments may chose to use a kernel or storage method somewhat different from the Gaussian pyramid used here, for example a Laplace pyramid, which would just add additional kernels to subtract the Gaussian mipmap levels from each other, or a slightly different distribution of kernel weights, for example, so as to imitate some optical properties of the eye or processing properties of the visual cortex.

The tonemapper 522 then takes the preprocessed image 504 as well as the blurred luminance mipmap 510 and generates a tonemapped finished image 524. The algorithm used here is similar to that of the first embodiment, except that with the blurred luminance mipmap 510 being a high-quality Gaussian blur, it is no longer necessary to blend several reads for the values of each mipmap level when calculating a pixel's adaptive luminance. However, the GPU's texture mapping unit will still read four pixels from the higher mipmap levels and blend them by bilinear interpolation for each pixel considered. In line 170, the tonemapper squares the similarity value between two adjacent mipmap levels before using it to reduce the weight of the higher mipmap level in determining the reference luminance yRef. This causes a faster dropoff of weights for larger contrasts than a merely linear reduction of weightFactor, thus reducing the halo effects dreaded in tonemapping HDR pictures into LDR representations without reducing the enhancement of more subtle contrasts. Instead of squaring the weightFactor one may also use any other convex function, such as raising weightFactor to a power higher than one but other than two. This power may also be user-adjustable to allow the user to select an input parameter that will influence the tradeoff between contrast preservation and halo avoidance appropriate for a given scene.

The result is a beautifully tonemapped picture in image 524, rivaling the output quality of specialized HDR software for tonemapping HDR photographs on desktop computers, except that instead of using many seconds or minutes for a single image frame on a powerful desktop computer, the second embodiment can do this thirty times per second for a high-definition video frame on a smartphone, thus allowing the recording of HDR video, in addition to HDR photographs, tonemapped in real-time at the time of recording and ready for sharing as relatively compact LDR video files.

CONCLUSION, RAMIFICATIONS, AND SCOPE

Accordingly, the reader will see that the tonemapping method and apparatus described allows us to tonemap images at very high speed even on relatively modest consumer-grade hardware.

The most fascinating application of this is tonemapping HDR video in real-time. While it would in theory be desirable to record all the information captured in ever higher resolutions and ever higher dynamic range, this would lead to a very large data volume, and indeed some professional and very high-priced video cameras are taking this approach. This would, however, be impractical for consumer-grade hardware that simply cannot handle the data volumes one would generate in this way. What is more, consumers typically like the instant satisfaction of immediately having a beautifully tonemapped video that they can watch and share on social networks instead of having to tonemap the video at a later time in a time-consuming process. At any rate, most video displays available today are not capable of displaying a dynamic range anywhere close to what can be found in nature and seen by the human eye, and thus preprocessing video to a lower dynamic range at the time of recording while still preserving details captured at a higher dynamic range provides memory- and bandwidth-efficient output without losing anything in terms of display quality so long as the video files are not meant for extensive later editing.

Another benefit is that tonemapping is fast enough that the user can see the result of changing tonemapping parameters in real time. This allows users to experiment and find the best settings to bring out detail and achieve creative effects by experimentation with immediate feedback. This is particularly advantageous because enhancing local contrast at different spatial scales inherently involves as compromise between preserving and potentially enhancing local contrast that the eye would see if looking at the real scene without introducing too many artifacts, such as halos, as a result of reducing dynamic range. There is as of now no truly satisfying method of guessing the best parameters for this tonemapping automatically, and perhaps there never will be one since this compromise is inherently a matter of aesthetic taste and the mood one wants to set for an image. For example, in our contemporary culture, many videographers would show more aggressive enhancement of local contrast when recording a man's face than when recording a woman's face. Thus the ability to view the results of tonemapping a video stream in real time allows the videographer to experiment conveniently with different parameters and find the settings most suitable to a scene and a desired artistic message.

Yet another benefit is that the reduced computational effort required saves battery life on mobile devices.

Although the description above contains many specificities, these should not be construed as limiting the scope of the embodiments but as merely providing illustrations of some of several embodiments. For example, although we have given examples in the context of Apple's Metal framework to control a GPU, other languages, such as OpenGL® ES, OpenGL® or OpenCL™ may be used, or the massively parallel processing of floating-point math may be executed not on a GPU at all but on another type of massively parallel processor, such as an FPGA programmed for the purpose. We also assumed use of one camera in the embodiments shown, but it is equally possible to use the techniques described to merge not several images taken consecutively by one camera, but several images taken synchronously by multiple cameras built into the same device or by different sensor areas or sensors of the same camera, or, as discussed, directly one exposure from a sensor capable of capturing images in high dynamic range.

Thus the scope of the embodiments should be determined by the appended claims and their legal equivalents rather than by the examples given.

I claim:

1. An apparatus for displaying a video stream, comprising at least one processor, memory, a user input device, and a display, said processor being adapted to apply a tonemapping operator to frames in an input video stream in real time, thereby generating a tonemapped output video stream, and to displaying said output video stream on said display in real time, said tonemapping operator being chosen to depend in its effect on a given pixel in a given video frame at least in part on contrast of said pixel with pixels in said pixel's neighborhood, said neighborhood being considered being larger than said pixel's immediate neighbors and smaller than the entirety of said video frame, said tonemapping operator further having at least one user-adjustable parameter, where a user may adjust said user-adjustable parameter using said user input device, said processor being further adapted to observe changes of said user-adjustable parameter and upon observing said changes to apply said changed user-adjustable parameter to incoming frames of said input video stream.

2. The apparatus of claim 1 where said apparatus also comprises a camera and said input video stream is generated by said camera in real time.

3. The apparatus of claim 2 where said apparatus is portable.

4. The apparatus of claim 2 where said apparatus is a smartphone.

5. The apparatus of claim 1 where said processor is a graphics processing unit.

6. The apparatus of claim 1 where said tonemapping operator is chosen to reduce an input video stream of a higher dynamic range into an output video stream of a lower dynamic range.

7. The apparatus of claim 1 where said tonemapping operator is chosen to evaluate said image contrast at a plurality of spatial scales.

8. The apparatus of claim 1 where application of said tonemapping operator comprises generating at least one intermediate image from each frame in said input video stream and used in rendering said output video stream.

9. The apparatus of claim 8 where application of said tonemapping operator comprises generating a plurality of intermediate images from each frame in said input video stream and used in rendering said output video stream.

10. The apparatus of claim 9 where at least some members of said plurality of intermediate images are generated at a resolution lower than the resolution of said input video stream.

11. The apparatus of claim 9 where at least some members of said plurality of intermediate images are generated as a mipmap.

12. An automated method for displaying a video stream, comprising receiving an input video stream, receiving at least one adjustable display parameter, applying a tonemapping operator to said video stream in real time, resulting in a tonemapped output video stream, and displaying said output video stream on a display, wherein said tonemapping operator is chosen to depend in its effect on a given pixel in a given video frame at least in part on contrast of said pixel with pixels in said pixel's neighborhood, said neighborhood being considered being larger than said pixel's immediate neighbors and smaller than the entirety of said video frame, and wherein said tonemapping operator has at least one adjustable parameter set to said adjustable display parameter.

13. The method of claim 12 where said input video stream is received from a camera in real time.

14. The method of claim 12 where said tonemapping operator is being applied by a graphics processing unit.

15. The method of claim 12 where said tonemapping operator is chosen to reduce an input video stream of a higher dynamic range into an output video stream of a lower dynamic range.

16. The method of claim 12 where said tonemapping operator is chosen to evaluate image contrast at a plurality of spatial scales.

17. The method of claim 12 where application of said tonemapping operator comprises generating at least one intermediate image from each frame in said input video stream and used in rendering said output video stream.

18. The method of claim 17, further comprising generating a plurality of intermediate images from each frame in said input video stream and used in rendering said output video stream.

19. The method of claim 18 where at least some members of said plurality of intermediate images are generated at a resolution lower than the resolution of said input video stream.

20. The method of claim 18 where at least some members of said plurality of intermediate images are generated as a mipmap.

* * * * *